(12) United States Patent
Zhang et al.

(10) Patent No.: US 10,390,290 B1
(45) Date of Patent: Aug. 20, 2019

(54) FLOW PROCESSING MIGRATION

(71) Applicant: Juniper Networks, Inc., Sunnyvale, CA (US)

(72) Inventors: Jing Zhang, Haidian (CN); Zengqiang Yuan, Beijing (CN); Mingming Quan, Beijing (CN); BinFang Sun, Beijing (CN); Lei Liang, Beijing (CN); Gaofeng Tian, Beijing (CN); Huaxiang Yin, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 234 days.

(21) Appl. No.: 15/383,116

(22) Filed: Dec. 19, 2016

(51) Int. Cl.
| | |
|---|---|
| *H04W 76/11* | (2018.01) |
| *H04W 76/12* | (2018.01) |
| *H04W 48/10* | (2009.01) |
| *H04L 12/741* | (2013.01) |
| *H04L 12/751* | (2013.01) |
| *H04L 29/08* | (2006.01) |
| *H04L 12/46* | (2006.01) |
| *H04W 88/16* | (2009.01) |

(52) U.S. Cl.
CPC ............. *H04W 48/10* (2013.01); *H04L 45/02* (2013.01); *H04L 45/54* (2013.01); *H04W 76/11* (2018.02); *H04W 76/12* (2018.02); *H04L 12/4633* (2013.01); *H04L 69/326* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 2005/0201371 | A1* | 9/2005 | Lauer | H04W 24/00 370/389 |
| 2011/0069663 | A1* | 3/2011 | Shu | H04L 63/30 370/328 |
| 2012/0082073 | A1* | 4/2012 | Andreasen | H04L 12/4633 370/310 |

* cited by examiner

*Primary Examiner* — Jason E Mattis
*Assistant Examiner* — Hong Shao
(74) *Attorney, Agent, or Firm* — Harrity & Harrity, LLP

(57) ABSTRACT

A first processing device may receive, from a first network device, a tunneling protocol message associated with a tunnel to be established between the first network device and a second network device. The first processing device may determine, based on the tunneling protocol message, a device identifier of the second network device. The first processing device may determine that a second processing device is to process a flow associated with the first network device and the second network device based on the device identifier of the second network device. The first processing device may provide information that identifies that the second processing device is to process the flow to permit the second processing device to process the flow associated with the first network device and the second network device.

20 Claims, 14 Drawing Sheets

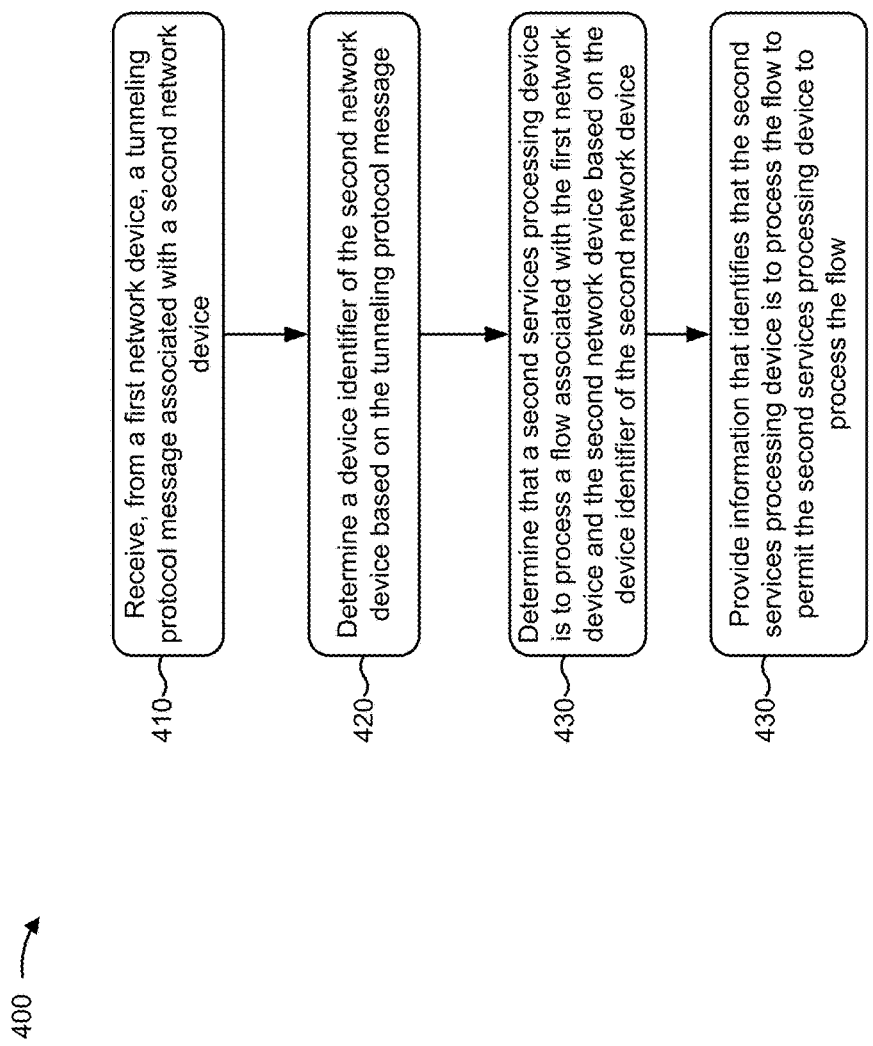

FLOW PROCESSING MIGRATION

BACKGROUND

A security device, such as a firewall, may perform packet processing on network traffic (e.g., may apply packet filters, security policies, screens, or the like). Flow-based packet processing treats related packets in the same way, depending on characteristics that were established for a first packet associated with a flow.

SUMMARY

According to some possible implementations, a first processing device may include one or more processors to receive, from a first network device, a tunneling protocol message associated with a tunnel to be established between the first network device and a second network device. The tunnel may permit a user equipment to receive network traffic associated with a packet network. The one or more processors may determine, based on the tunneling protocol message, a device identifier of the second network device. The one or more processors may determine that a second processing device is to process a flow associated with the first network device and the second network device based on the device identifier of the second network device. The first processing device may have been previously identified to process the flow associated with the first network device and the second network device. The one or more processors may provide information that identifies that the second processing device is to process the flow to permit the second processing device to process the flow associated with the first network device and the second network device.

According to some possible implementations, a non-transitory computer-readable medium may store one or more instructions that, when executed by one or more processors of a first device, cause the one or more processors to receive, from a first network device, a tunneling protocol message associated with a tunnel to be established between the first network device and a second network device. The tunnel may permit a user equipment to access a packet network. The one or more instructions may cause the one or more processors to determine, based on the tunneling protocol message, a device identifier of the second network device. The one or more instructions may cause the one or more processors to determine that a second device is to process a flow associated with the first network device and the second network device based on the device identifier of the second network device. The first device may have been previously identified to process the flow associated with the first network device and the second network device. The one or more instructions may cause the one or more processors to provide information that identifies that the second device is to process the flow to permit the second device to process the flow associated with the first network device and the second network device.

According to some possible implementations, a method may include receiving, by a first device, a tunneling protocol message associated with a tunnel associated with a first network device and a second network device. The tunnel may permit a user equipment to access a network. The method may include determining, by the first device, a direction or a type of the tunneling protocol message. The method may include determining, by the first device, a device identifier of the second network device based on the direction or the type of the tunneling protocol message. The method may include determining, by the first device and based on the device identifier of the second network device, that a second device is to process a flow between the first network device and the second network device. The first device may have been previously identified to process the flow between the first network device and the second network device. The method may include providing, by the first device, information that identifies that the second device is to process subsequent tunneling protocol messages associated with the flow between the first network device and the second network device.

BRIEF DESCRIPTION OF THE DRAWINGS

FIG. 4 is a flow chart of an example process for performing flow processing migration.

DETAILED DESCRIPTION

Figure 1A:
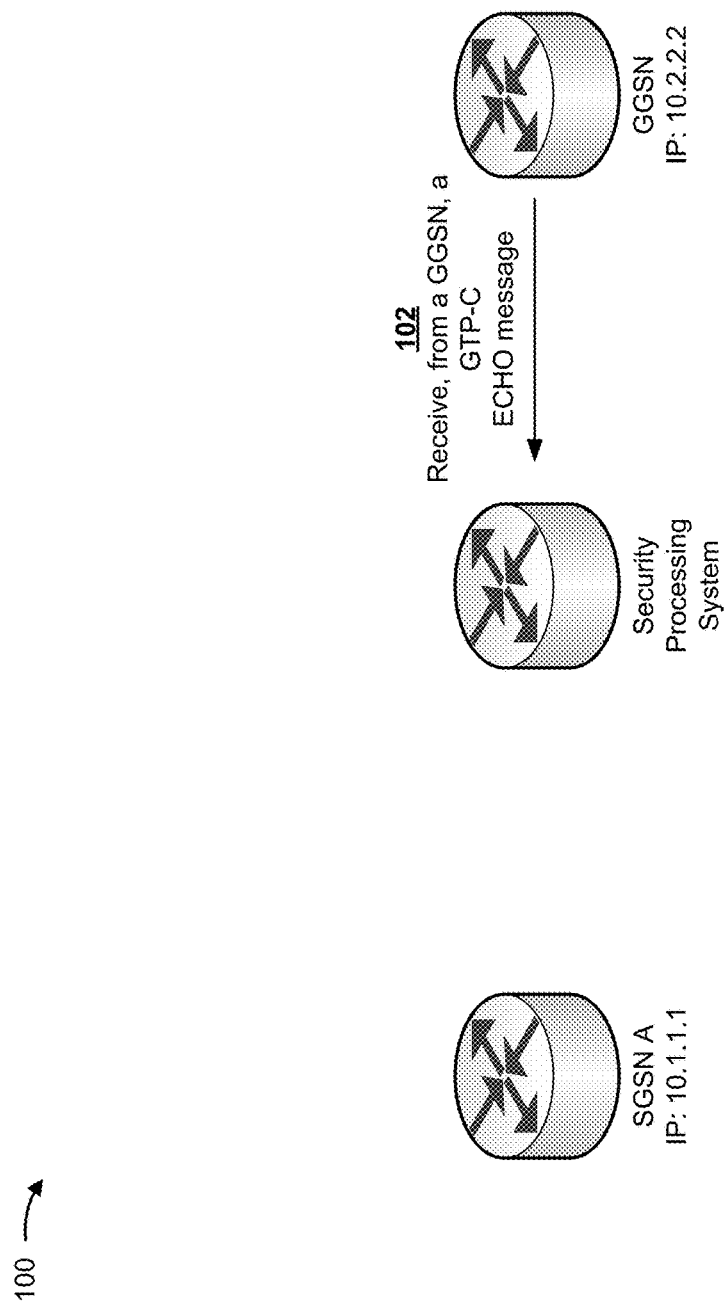
FIGS. 1A-1K are diagrams of an overview of an example implementation described herein.

The following detailed description of example implementations refers to the accompanying drawings. The same reference numbers in different drawings may identify the same or similar elements.

In a general packet radio service (GPRS) network, a serving GPRS support node (SGSN) and a gateway GPRS support node (GGSN) may establish a tunnel to provide a user equipment (UE) with access to external packet networks. For example, a UE may connect to the SGSN, which may cause the SGSN to establish a tunnel (e.g., a GPRS tunneling protocol (GTP) tunnel) with the GGSN. As an example, the SGSN may receive network traffic from the UE, encapsulate the network traffic, and provide the encapsulated network traffic to the GGSN via the tunnel. The GGSN may de-capsulate the network traffic, and provide the network traffic to a remote device (e.g., a server device) associated with an external packet network. A similar process may occur in the reverse direction (i.e., associated with network traffic provided by the remote device to the UE).

The SGSN and the GGSN may exchange tunneling protocol messages (e.g., particular types of GTP-C messages, GTP-Cv2 messages, or the like) for path management (e.g., ECHO requests, ECHO responses, etc.), tunnel management (e.g., create session requests, create bearer requests, create packet data protocol (PDP) context requests, modify bearer requests, or the like), mobility management (e.g., forward relocation requests, forward relocation responses, or the like), and/or other purposes.

A security processing system, such as a GTP firewall, may process the tunneling protocol messages. For example, the security processing system may implement an application layer gateway (ALG) that inspects tunneling protocol messages that are exchanged between the SGSN and the GGSN, and processes (e.g., drops, allows, etc.) the tunneling protocol messages based on configured security profiles.

In some implementations, the security processing system may include multiple services processing devices that process particular flows. For example, a particular services processing device, of the security processing system, may be responsible for processing particular flows associated with a particular GGSN (e.g., a sequence of messages exchanged between various SGSNs and the particular GGSN), and/or maintaining information associated with statuses of GTP tunnels associated with the flows.

In some implementations, a main processing device, of the security processing system, may select a services processing device to process a particular flow based on a device identifier of the GGSN. That is, a particular services processing device may process each flow associated with a particular GGSN. As a particular example, assume that a UE connects to an SGSN for data service. In this case, the SGSN may provide, to a GGSN, a GTP-C tunnel management message that requests the GGSN to establish a GTP tunnel with the SGSN. Assume that the GTP-C tunnel management message is the first message associated with a flow between the SGSN and the GGSN. The main processing device may receive the GTP-C tunnel management message, identify a device identifier of the GGSN (e.g., an Internet Protocol (IP) address, or the like), and select, based on the device identifier of the GGSN, a services processing device (e.g., services processing device 1) to process subsequent messages associated with a flow between the SGSN and the GGSN. In this case, services processing device 1 may store an entry, in a table of services processing device 1, that includes information associated with the flow (e.g., security features to apply, a status of the GTP tunnel, and/or or the like).

Continuing the example, assume that a geographic location of the UE changes. In this case, the SGSN may perform a mobility management procedure. For example, the SGSN (e.g., "SGSN A") may provide, to another SGSN (e.g., "SGSN B"), a GTP-C mobility management message associated with a mobility management procedure (e.g., a forward relocation message) to permit SGSN B to provide data service to the UE. SGSN B may provide, to the GGSN, a GTP-C tunnel management message that requests the GGSN to update information associated with the GTP tunnel (e.g., to permit the GGSN to provide network traffic to SGSN B instead of SGSN A).

The main processing device may receive the GTP-C tunnel management message, and select a services processing device to process the GTP-C tunnel management message. In this case, the main processing device may determine a device identifier of the GGSN based on the GTP-C tunnel management message, and determine that services processing device 1 is to process the GTP-C tunnel management message. Services processing device 1 may receive the GTP-C tunnel management message, determine that the GTP-C message is requesting an update to a GTP tunnel, determine that services processing device 1 includes information identifying a status of the GTP tunnel, and provide, to the GGSN, the GTP-C tunnel management message. In this way, the GGSN may receive the GTP-C tunnel management message and update information associated with the GTP tunnel such that the GGSN may provide, to SGSN B, network traffic that is destined to the UE.

In some cases, the first GTP-C message, that the security processing system processes, associated with a flow between an SGSN and a GGSN may be bidirectional. That is, the particular type of GTP-C message may be capable of being provided from either a GGSN or an SGSN. As a particular example, the GTP-C message may be a path management message, such as an ECHO request or ECHO response. In this case, the main processing device may be incapable of identifying a device identifier of the GGSN. For example, the main processing device may not store information identifying IP prefixes associated with GGSNs and SGSNs. As such, the main processing device may determine a source address and a destination address of the GTP-C message, however may be incapable of identifying which address is associated with the GGSN. Comparatively, in other situations, the first GTP-C message may be unidirectional (e.g., provided in association with only a particular direction, such as from an SGSN to a GGSN or from a GGSN to an SGSN). In such cases, the main processing device may accurately select a services processing device, to process the message, based on identifying a device identifier of the GGSN.

In some cases, the security processing system may be prevented from dropping GTP-C ECHO messages because SGSNs and GGSNs may exchange GTP-C ECHO messages for availability and/or reachability purposes. Thus, the main processing device may select a services processing device to process subsequent messages of the flow based on a destination address of the GTP-C ECHO message. In some cases, the destination address may correspond to a device identifier of the SGSN (e.g., in cases where the GGSN is providing the GTP-C ECHO message). Thus, the main processing device may inaccurately select a services processing device to process subsequent messages associated with the flow (e.g., by selecting based on a device identifier of the SGSN rather than a device identifier of the GGSN).

As an example, assume that a UE is initially connected to SGSN A. Further, assume that services processing device 1 is processing GTP-C messages associated with a flow between SGSN A and a GGSN. Further still, assume that the main processing device selected services processing device 1 to process the flow based on a device identifier of SGSN A (e.g., instead of the GGSN). Additionally, assume that the UE changes geographic location and connects to SGSN B. SGSN B may provide, to the GGSN, a GTP-C tunnel management message requesting the GGSN to update GTP tunnel information. The main processing device may receive the GTP-C tunnel management message, and determine a device identifier of the GGSN based on the GTP-C tunnel management message being unidirectional.

Additionally, the main processing device may, based on the device identifier of the GGSN, select services processing device 2 to process the GTP-C tunnel management message. Thereby, the main processing device may provide the GTP-C tunnel management message to a services processing device (i.e., services processing device 2) that is not processing messages associated with the GGSN and/or does not include stored information associated with the GTP tunnel. In this case, services processing device 2 may drop the GTP-C tunnel management message, thereby preventing the GGSN from updating the tunnel information (e.g., a handover of the UE from SGSN A to SGSN B may therefore fail), and requiring that SGSN B re-establish a GTP tunnel with the GGSN. In the meantime, network traffic received from and/or addressed to the UE may be dropped, thereby introducing communication issues, such as packet losses, high latency, and/or the like, and increasing network congestion.

Implementations described herein enable a services processing device to receive a tunneling protocol message associated with a flow between an SGSN and a GGSN, determine a device identifier of the GGSN, determine that another services processing device is to process the flow, and provide information that permits the other services processing device to process the flow (e.g., store an entry in a respective table, and process subsequent messages of the flow based on the entry). For example, implementations described herein enable a security processing system to migrate flow processing between services processing devices.

In this way, implementations described herein enable a main processing device to select a services processing device without having first identified a device identifier of the GGSN. Additionally, implementations described herein enable the selected services processing device to subsequently identify a device identifier of the GGSN, and determine that another services processing device is to process the flow (e.g., in situations where the main processing device selected the services processing device based on a device identifier of an SGSN). Additionally, implementations described herein enable the services processing device to provide, to the other services processing device and/or the main processing device, information that enables the other services processing device to store an entry in a respective table, process subsequent messages of the flow, and/or maintain information associated with a GTP tunnel associated with the flow.

In this way, the other services processing device may subsequently process a GTP-C tunnel management message associated with a tunnel update request, thereby enabling the GGSN to update the tunnel information (e.g., resulting in a successful handover of the UE). In this way, implementations described herein reduce packet losses, reduce latency, and/or the like, thereby conserving processor and/or memory resources of UEs, network devices (e.g., SGSNs, GGSNs, and/or security processing systems), and/or remote devices (e.g., server devices, or the like).

While implementations herein describe particular tunneling message protocols, particular types of network devices, and/or particular types of networks, implementations described herein are applicable to other types of tunneling message protocols, other types of network devices, and/or other types of networks. For example, while implementations herein describe a GPRS network, SGSNs, and/or GGSNs, other implementations include other types of networks (e.g., fifth generation (5G) networks, Long Term Evolution (LTE) networks, or the like), other network devices (e.g., serving gateway (SGW) devices, packet data network gateway (PGW) devices, mobility management entity (MME) devices, or the like), and/or the like.

FIGS. 1A-1K are diagrams of an overview of an example implementation 100 described herein. As shown in FIG. 1A, and by reference number 102, a security processing system (e.g., a firewall) may receive, from a GGSN, a GTP-C ECHO message. For example, the security processing system may process GTP-C messages that are exchanged between the GGSN and SGSN A (e.g., may implement a GTP ALG).

As an example, assume that the GTP-C ECHO message is the first message associated with a flow between SGSN A and the GGSN (e.g., the first message that is processed by the security processing system for the flow). For example, a flow may refer to a sequence of messages that share common information, such as five-tuple information (e.g., a source address, a destination address, a source port identifier, a destination port identifier, and a protocol identifier). As used herein, a message may refer to a communication structure for communicating information, such as a protocol data unit (PDU), a packet, a datagram, a segment, a block, a cell, a frame, a subframe, a slot, a symbol, a portion of any of the above, and/or another type of formatted or unformatted unit of data capable of being transmitted via a network.

Figure 1B:
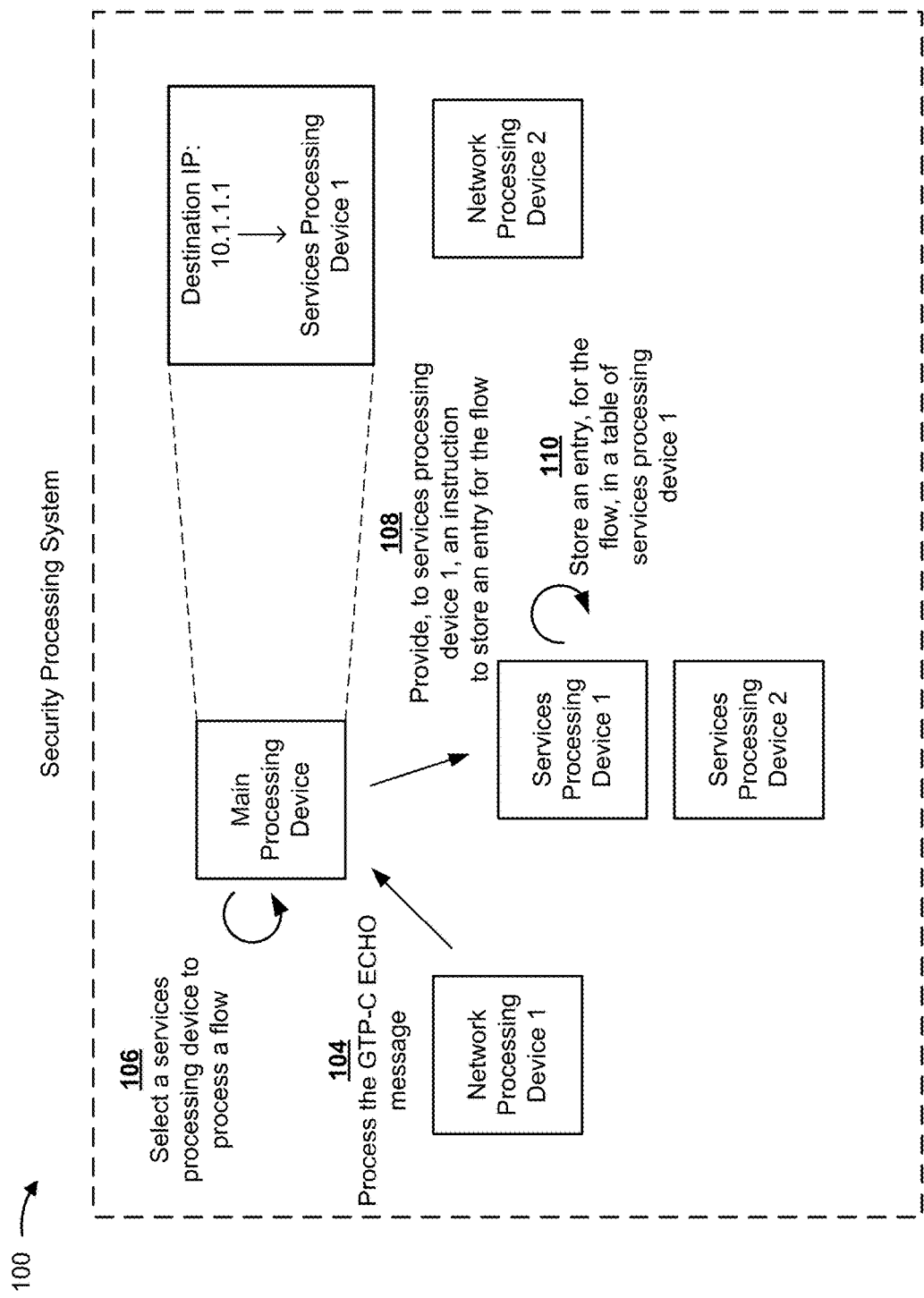

As shown in FIG. 1B, the security processing system may include network processing device 1, a main processing device, services processing device 1, services processing device 2, and network processing device 2. As shown by reference number 104, network processing device 1 may process the GTP-C ECHO message. For example, network processing device 1 may receive the GTP-C ECHO message, identify five-tuple information, and determine whether an entry, for the flow, is stored in a table of network processing device 1 (e.g., a flow table, a hash table, or the like). For example, network processing device 1 may include a table that stores information that associates particular flows and particular services processing devices that are processing the flows. Assume that network processing device 1 does not identify an entry in the table (e.g., because the GTP-C ECHO message is the first message associated with the flow that is processed by the security processing system).

In this case, network processing device 1 may provide the GTP-C ECHO message to the main processing device. For example, the main processing device may determine, based on an algorithm, a particular services processing device that is to process subsequent messages associated with the flow between SGSN A and the GGSN. For example, the main processing device may store information that maps device identifiers of GGSNs and services processing devices that are to process flows associated with respective GGSNs.

In some implementations, the main processing device may select services processing devices, to process particular flows, based on a device identifier associated with the GGSN (e.g., an IP address, a Media Access Control (MAC) address, and/or the like). That is, a particular services processing device may process each flow associated with a particular GGSN. In some implementations, if the main processing device identifies a device identifier of the GGSN (e.g., based on the type of GTP-C message being unidirectional), then the main processing device may select a services processing device based on the device identifier of the GGSN.

Additionally, or alternatively, if the main processing device is incapable of identifying a device identifier of a GGSN (e.g., based on the type of GTP-C message being bidirectional), then the main processing device may select a services processing device based on a particular address (e.g., destination address or source address) associated with the GTP-C message. In such cases, and as described elsewhere herein, the main processing device may select a services processing device based on a device identifier of an SGSN (e.g., inaccurately select a services processing device).

In some implementations, the main processing device may provide, to a services processing device, an instruction (e.g., via an entry management message) to store an entry for the flow in a table of the services processing device, and may provide information regarding treatment of the flow. For example, a services processing device may store an entry in a table, of the services processing device, that includes information associated with processing the flow (e.g., security features to be applied to messages of the flow, a state of the flow, ALGs to be applied to the flow, firewall features to be applied to the flow, a status of a GTP tunnel, or the like). For example, the security processing system may provide express processing. Express processing may refer to processing a message without forwarding the message to the main processing device for additional processing. In this way, the services processing device may process subsequent messages of the flow, and may not be required to forward the subsequent messages to the main processing device for processing, thereby reducing latency, improving throughput, and conserving processor and/or memory resources of the main processing device.

As shown by reference number 106, the main processing device may select a services processing device to process a flow. For example, as shown, the main processing device may determine that services processing device 1 is to process the flow between SGSN A and the GGSN. For example, the main processing device may determine, based on the destination IP address of the GTP-C ECHO message (e.g., the IP address of SGSN A), that services processing device 1 is to process subsequent messages associated with the flow. As shown by reference number 108, the main processing device may provide, to services processing device 1, an instruction to store an entry for the flow. Additionally, or alternatively, the main processing device may provide the GTP-C ECHO message to services processing device 1 for processing. As shown by reference number 110, services processing device 1 may store an entry, for the flow, in a table of services processing device 1. In this way, services processing device 1 may process subsequent messages of the flow based on the entry (e.g., may perform express processing).

Figure 1C:
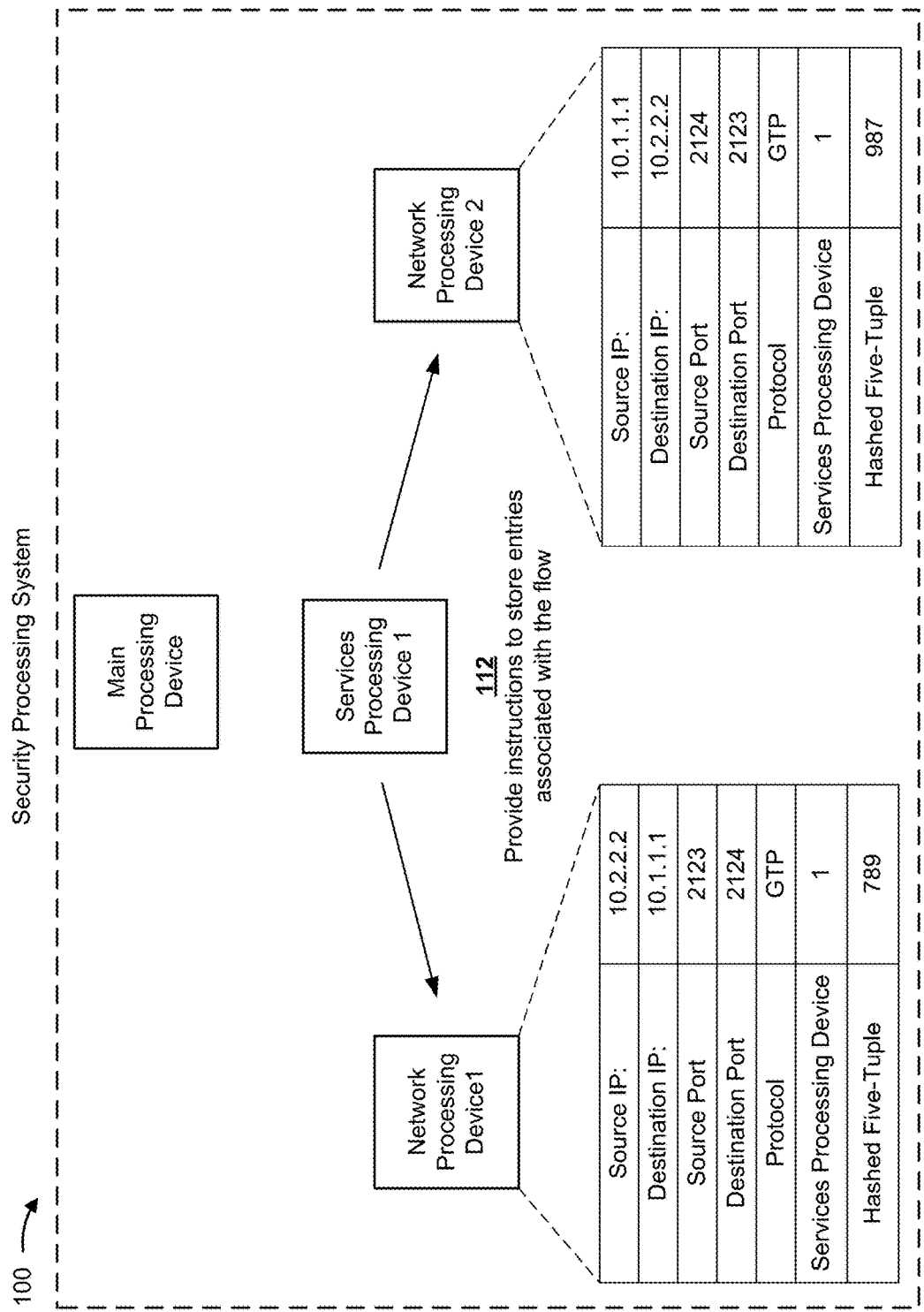

As shown in FIG. 1C, and by reference number 112, services processing device 1 may provide instructions to store entries associated with the flow. For example, services processing device 1 may provide, to network processing device 1 and network processing device 2, respective instructions to store entries in respective tables (e.g., entries that identify that services processing device 1 is processing the flow and/or identify that subsequent messages of the flow are to be provided to services processing device 1). In this way, network processing device 1 may receive, from the GGSN, subsequent messages associated with the flow, determine that hashed five-tuples of the subsequent messages match an entry in a table of network processing device 1, and determine that services processing device 1 is to process the subsequent messages based on the entry. Network processing device 2 may perform a similar function for flows traveling in the reverse direction (e.g., messages received from SGSN A).

Figure 1D:
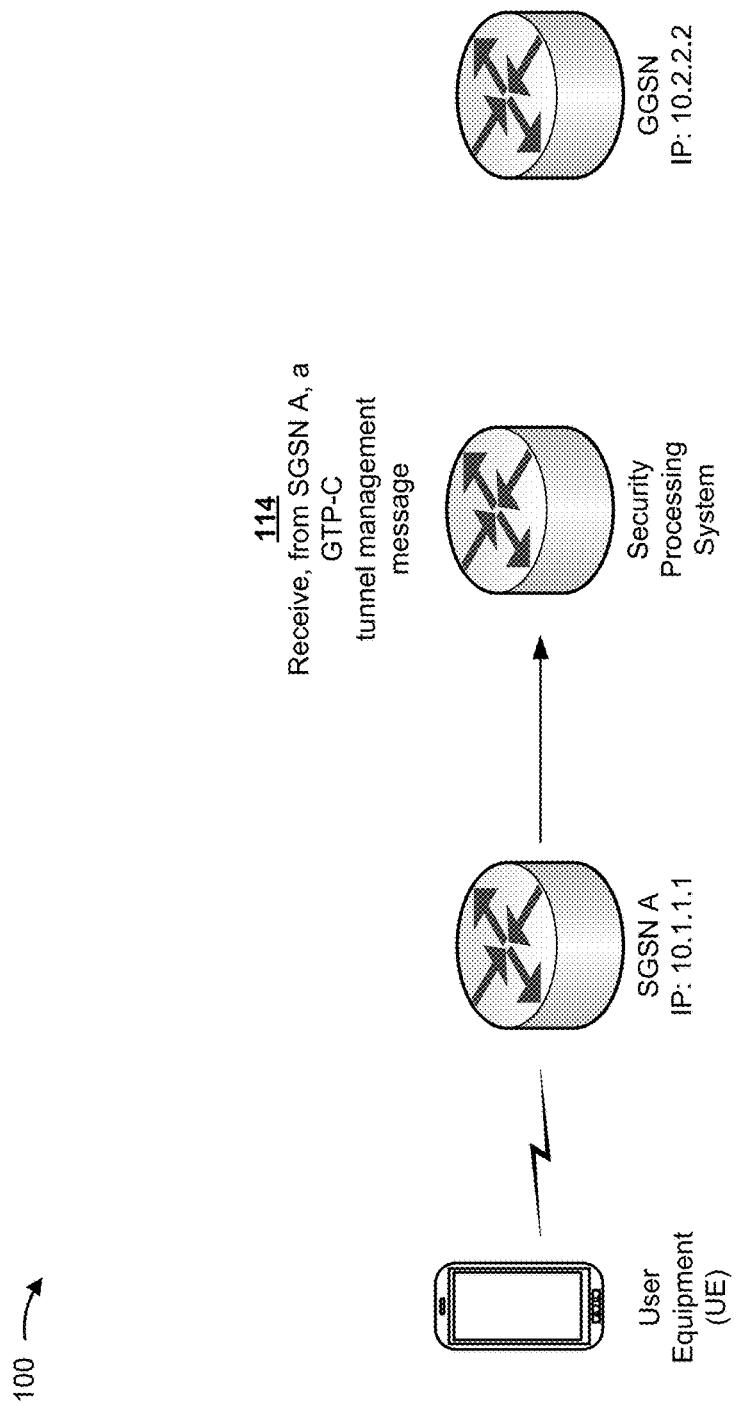

As shown in FIG. 1D, and by reference number 114, the security processing system may receive, from SGSN A, a GTP-C tunnel management message. For example, the GTP-C tunnel management message may include a message that requests a GTP tunnel to be established between SGSN A and the GGSN (e.g., a create session request, a create bearer request, a packet data protocol (PDP) context request, or the like). For example, a UE may connect to SGSN A for data service, and SGSN A may request the GGSN to establish one or more GTP tunnels based on the UE connecting to SGSN A. In some implementations, a GTP tunnel may include a channel between an SGSN and a GGSN that enables a UE to connect to external networks.

Figure 1E:
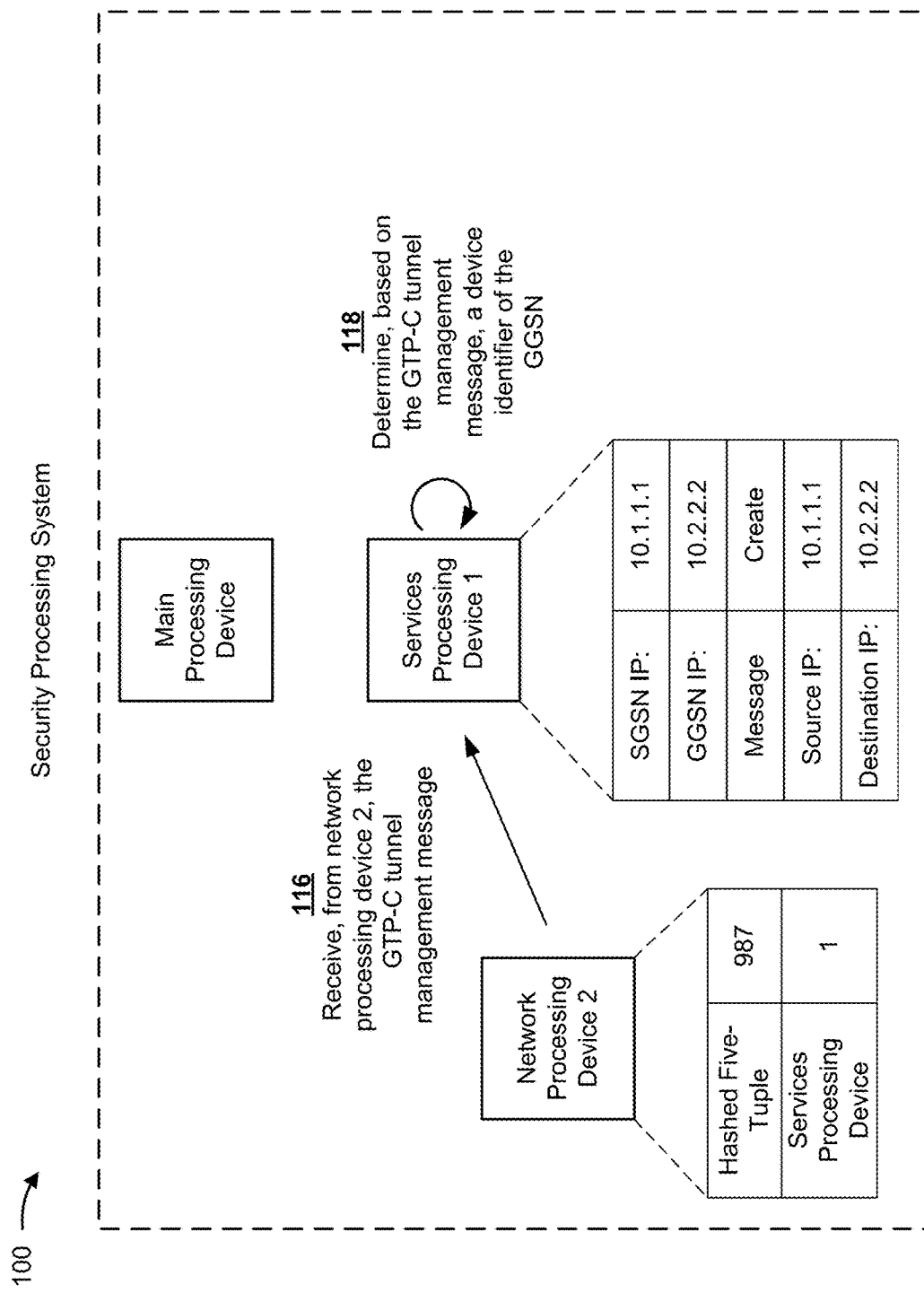

As shown in FIG. 1E, and by reference number 116, services processing device 1 may receive, from network processing device 2, the GTP-C tunnel management message. In some implementations, network processing device 2 may hash the five-tuple associated with the GTP-C tunnel management message, and determine that the hashed five-tuple matches an entry in a table of network processing device 2 (e.g., based on an entry that was stored as described in association with FIG. 1C). Network processing device 2 may determine that services processing device 1 is to process the GTP-C tunnel management message based on the entry, and provide, to services processing device 1, the GTP-C tunnel management message.

As shown by reference number 118, services processing device 1 may determine, based on the GTP-C tunnel management message, a device identifier of the GGSN. In some implementations, services processing device 1 may determine a device identifier of a GGSN based on performing a message processing technique (e.g., a GTP analysis, or the like). For example, services processing device 1 may identify the device identifier of the GGSN based on parsing the GTP-C message, identifying a type of the GTP-C message, identifying information associated with a particular field of the GTP-C message, identifying a direction of the GTP-C message, or the like. In other words, if the type of GTP-C message is unidirectional, then services processing device 1 may identify a device identifier of the GGSN. In this case, because the GTP-C tunnel management message is unidirectional, services processing device 1 may determine a device identifier of the GGSN.

Figure 1F:
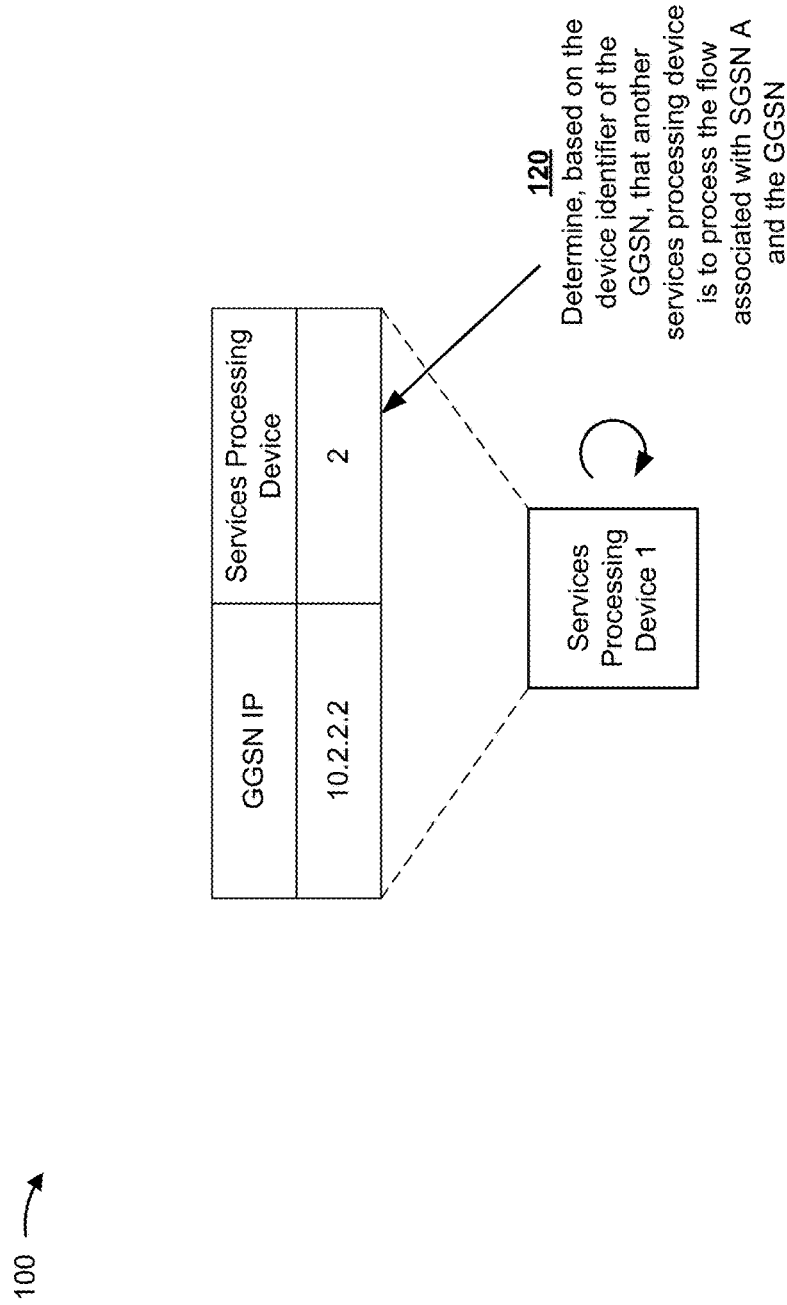

As shown in FIG. 1F, and by reference number 120, services processing device 1 may determine, based on the device identifier of the GGSN, that another services processing device is to process the flow associated with SGSN A and the GGSN. For example, as described above in connection with FIG. 1B, if the first packet associated with the flow is a GTP-C ECHO message (or another type of bidirectional GTP-C message), then the main processing device may select a services processing device, to process a flow, without having identified a device identifier of the GGSN. In some cases, the main processing device may select an incorrect services processing device to process the flow (e.g., based on a device identifier of the SGSN).

In some implementations, services processing device 1 may, using the device identifier of the GGSN and the same algorithm used by the main processing device, determine a services processing device that is to process the flow. For example, as shown, services processing device 1 may determine that services processing device 2 is to process the flow.

Figure 1G:
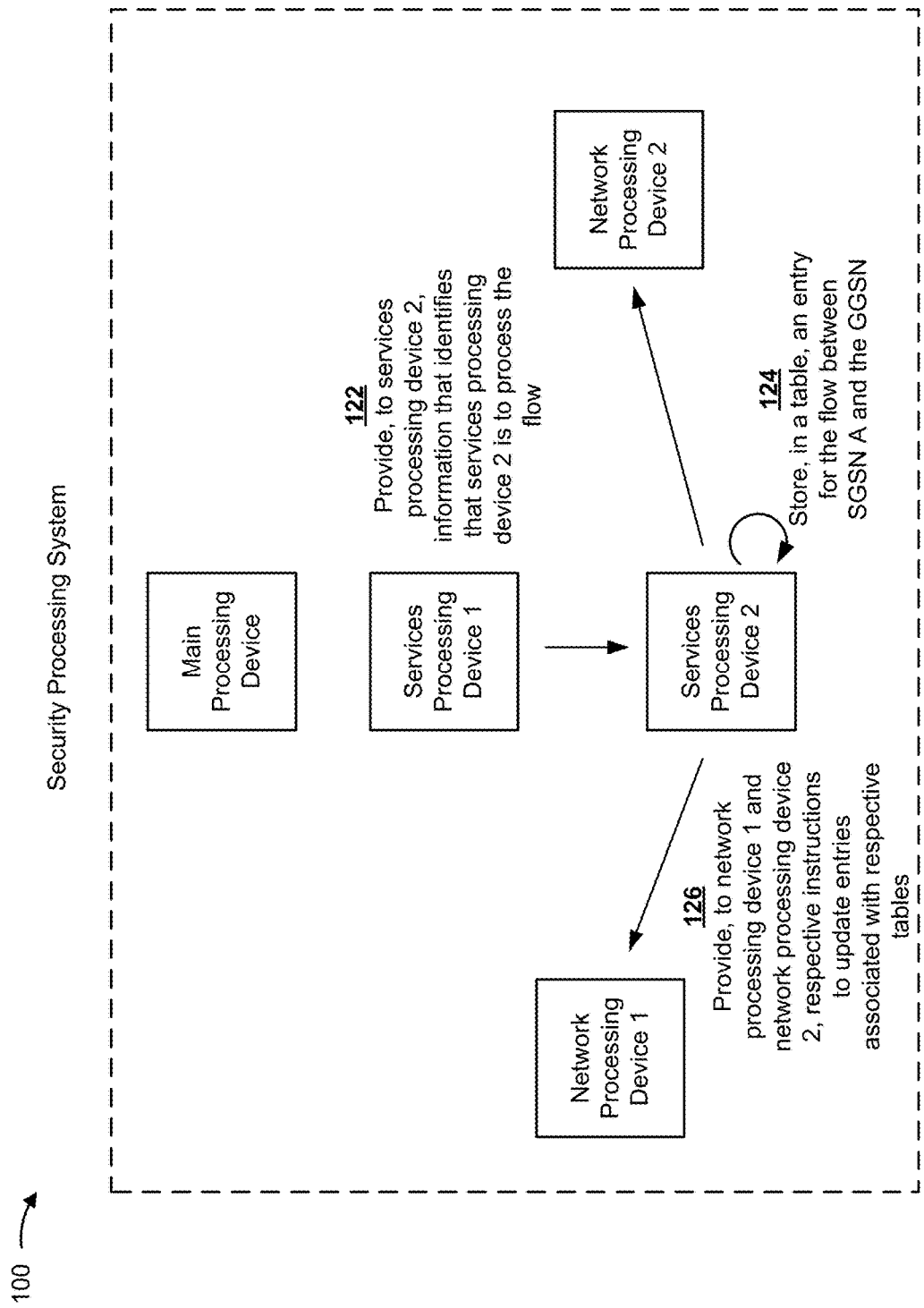

As shown in FIG. 1G, and by reference number 122, services processing device 1 may provide, to services processing device 2, information that identifies that services processing device 2 is to process the flow. For example, services processing device 1 may provide, to services processing device 2, an instruction that causes services processing device 2 to store an entry for the flow associated with SGSN A and the GGSN (e.g., to perform express processing). Additionally, or alternatively, services processing device 1 may provide, to services processing device 2, the GTP-C tunnel management message (e.g., including a flag that identifies that services processing device 2 is to process the flow). As shown by reference number 124, services processing device 2 may store, in a table, an entry for the flow between SGSN A and the GGSN.

As shown by reference number 126, services processing device 2 may provide, to network processing device 1 and network processing device 2, respective instructions to update entries associated with respective tables. For example, network processing device 1 and/or network processing device 2 may update entries, associated with respective tables, to identify that subsequent messages associated with the flow are to be provided to services processing device 2 for processing (e.g., instead of services processing device 1). In some implementations, services processing device 1 may remove, from the table of services processing device 1, the entry associated with the flow based on providing the instruction to services processing device 2 (e.g., may cause the entry to expire in a particular time frame, or the like).

Figure 1H:
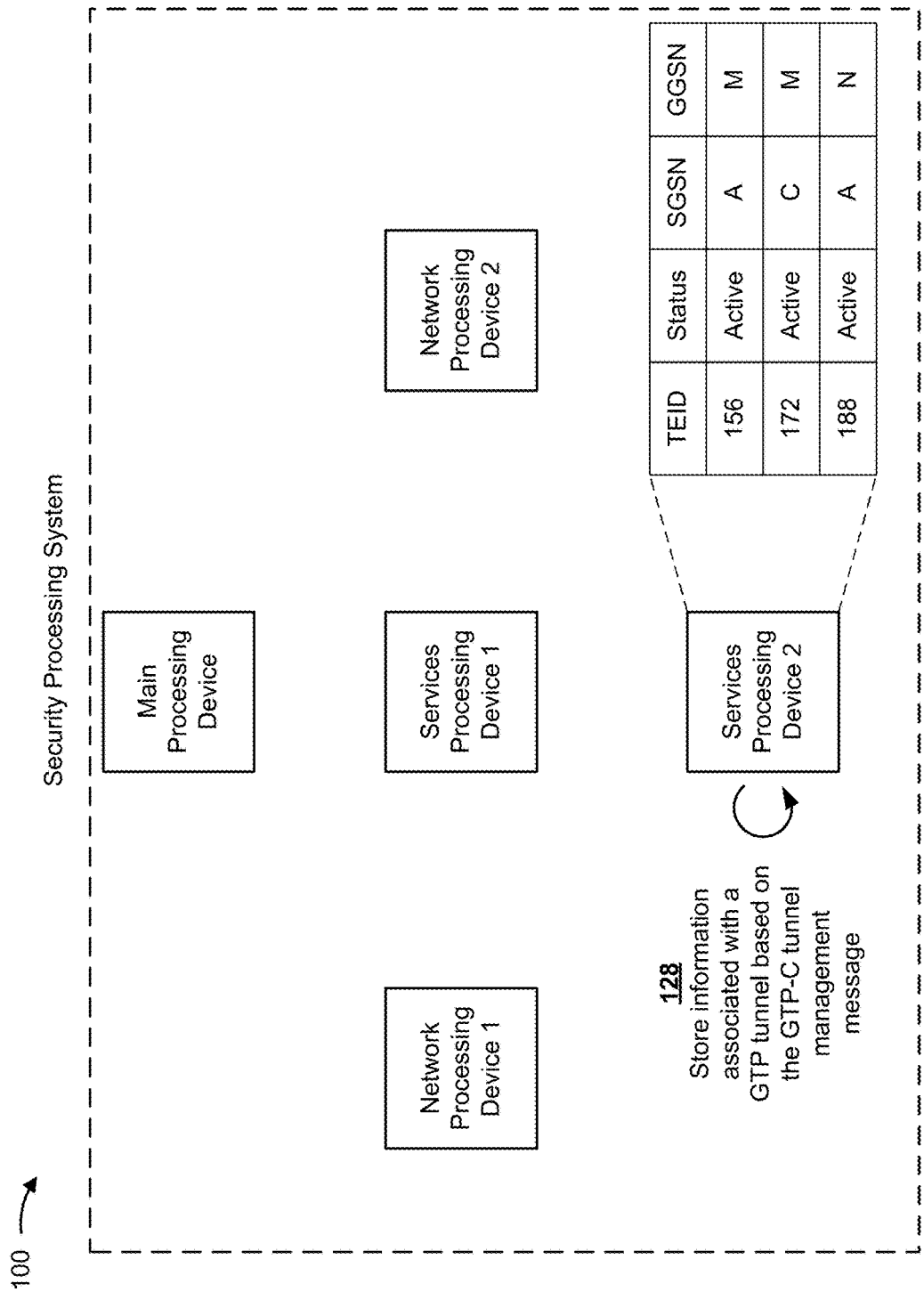

As shown in FIG. 1H, and by reference 128, services processing device 2 may store information associated with a GTP tunnel based on the GTP-C tunnel management message. For example, services processing device 2 may store information that identifies a tunnel endpoint identifier (TEID) associated with the GTP tunnel (e.g., "156"), a status of the tunnel (e.g., active, or the like), and/or information that identifies device identifiers of SGSN A and the GGSN (e.g., GGSN "M"). In some implementations, a TED may uniquely identify a GTP tunnel, may identify a particular SGSN and/or GGSN (e.g., GTP tunnel endpoint(s)), may identify a UE associated with the GTP tunnel, or the like.

Figure 1I:
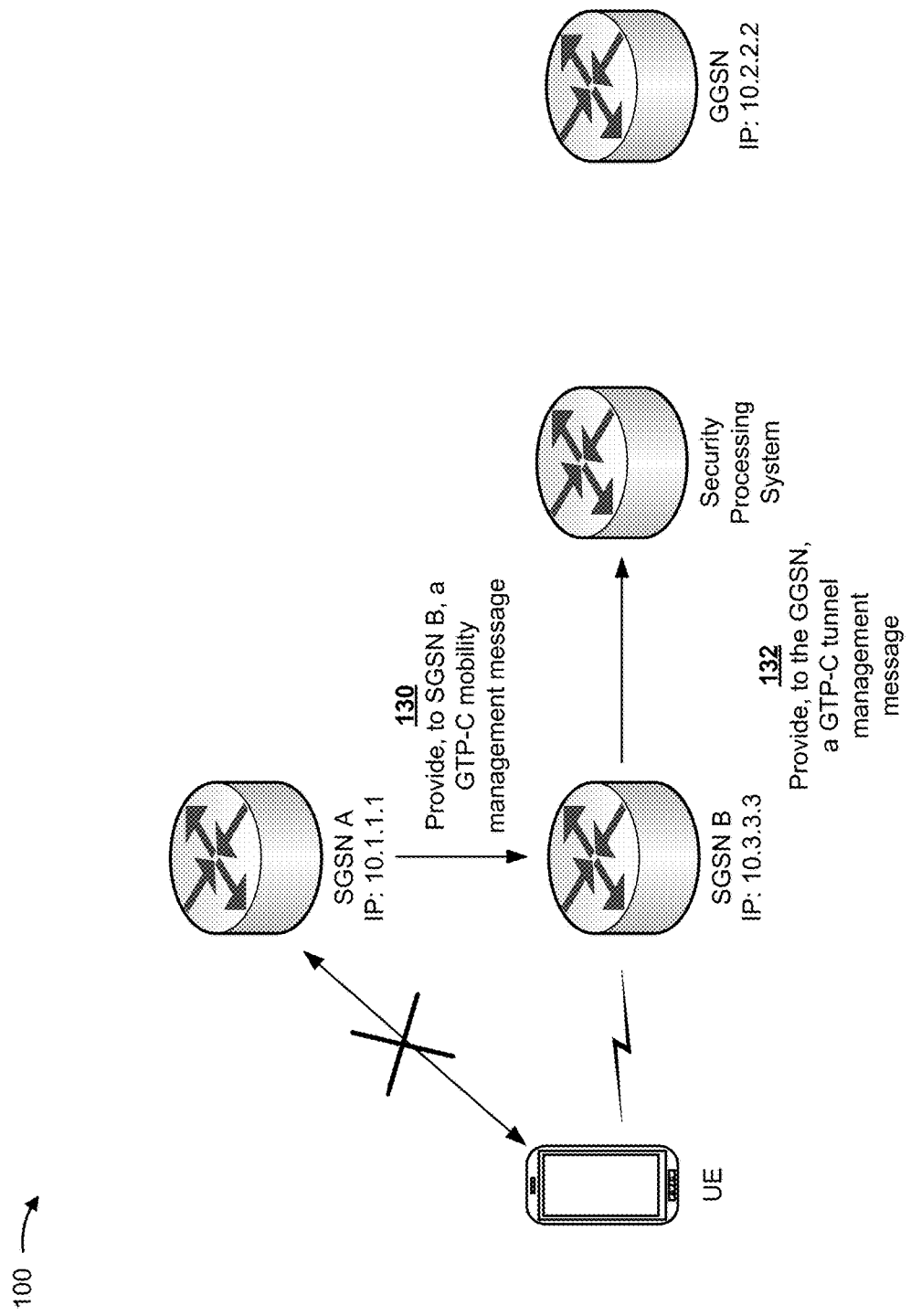

As shown in FIG. 1I, and by reference number 130, SGSN A may provide, to SGSN B, a GTP-C mobility management message. For example, the GTP-C mobility management message may include a forward relocation message, or the like. As an example, assume that the UE changes geographic location, and connects to SGSN B for data service (e.g., a handover procedure may be performed). As shown by reference number 132, SGSN B may provide, to the GGSN, a GTP-C tunnel management message. For example, the GTP-C tunnel management message may identify an update to the GTP tunnel associated with the UE, and include information that identifies the TED and a device identifier of SGSN B. As an example, the GTP-C tunnel management message may request the GGSN to update SGSN information associated with the GTP tunnel (e.g., change a destination address of the GTP tunnel to the device identifier of SGSN B). As shown, the security processing system may receive the GTP-C tunnel management message.

Figure 1J:
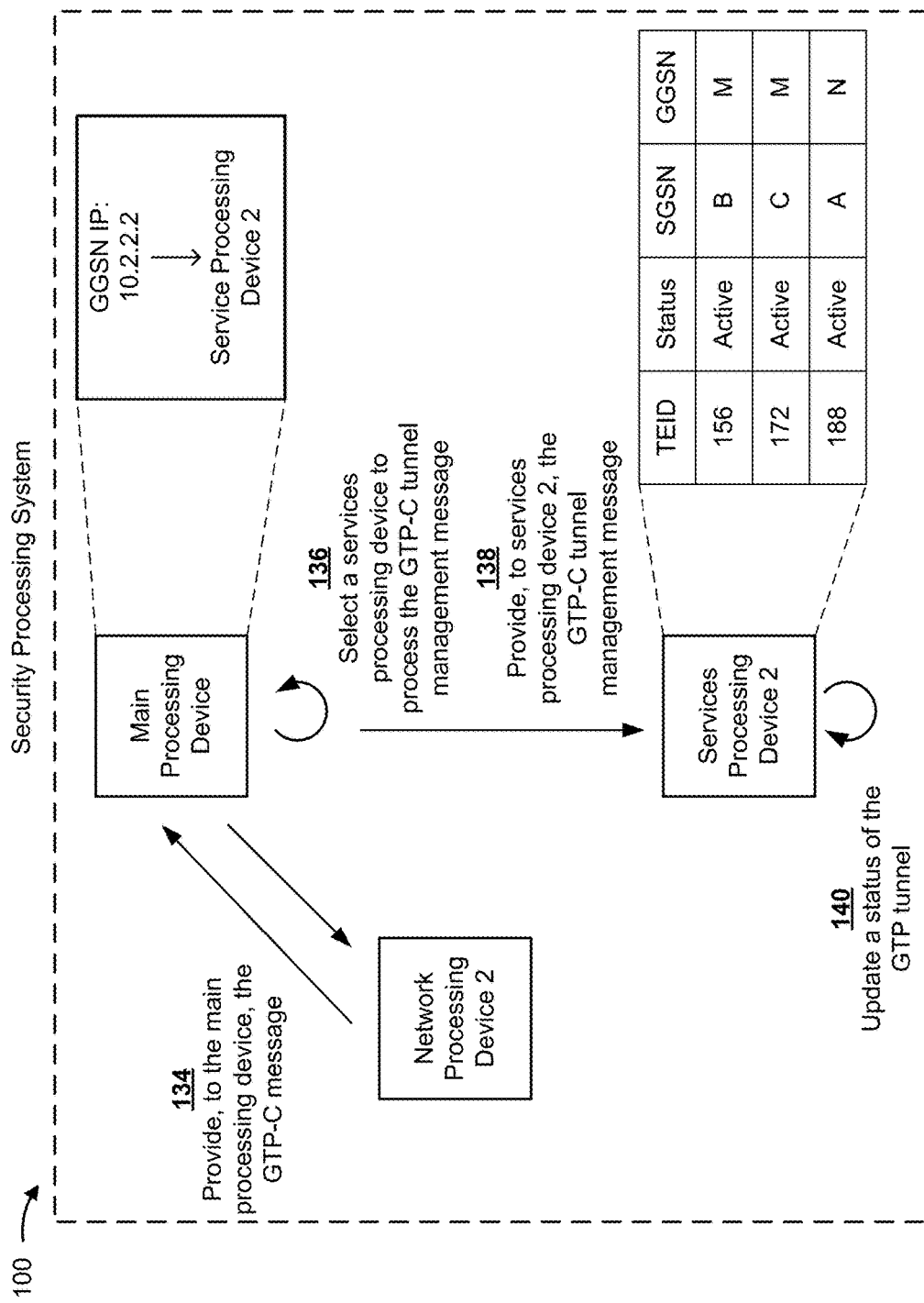

As shown in FIG. 1J, and by reference number 134, network processing device 2 may provide, to the main processing device, the GTP-C tunnel management message. For example, network processing device 2 may identify five-tuple information associated with the GTP-C message, determine that an entry is not stored in a table of network processing device 2, and, as a result, provide the GTP-C tunnel management message to the main processing device (e.g., for selection of a services processing device to perform express processing). For example, assume that the GTP-C tunnel management message is the first message, associated with a flow between SGSN B and the GGSN, that is processed by the security processing system. Alternatively, network processing device 2 may provide, to services processing device 2, the GTP-C tunnel management message if entries for the flow were established by services processing device 2 and/or network processing device 2 (e.g., based on the GTP-C tunnel management message being a subsequent message of the flow instead of the first message).

As shown by reference number 136, the main processing device may select a services processing device to process the GTP-C tunnel management message (e.g., using an algorithm described elsewhere herein). For example, as shown, the main processing device, using a device identifier of the GGSN, may determine that services processing device 2 is to process the GTP-C tunnel management message.

As shown by reference number 138, the main processing device may provide, to services processing device 2, the GTP-C tunnel management message. As shown by reference number 140, services processing device 2 may update a status of the GTP tunnel. For example, services processing device 2 may parse the GTP-C tunnel management message, identify the GTP tunnel (e.g., based on the TED "156"), identify a device identifier of SGSN B, and update SGSN information associated with the GTP tunnel. As an example, services processing device 2 may update SGSN address information from a device identifier of SGSN A to a device identifier of SGSN B.

Figure 1K:
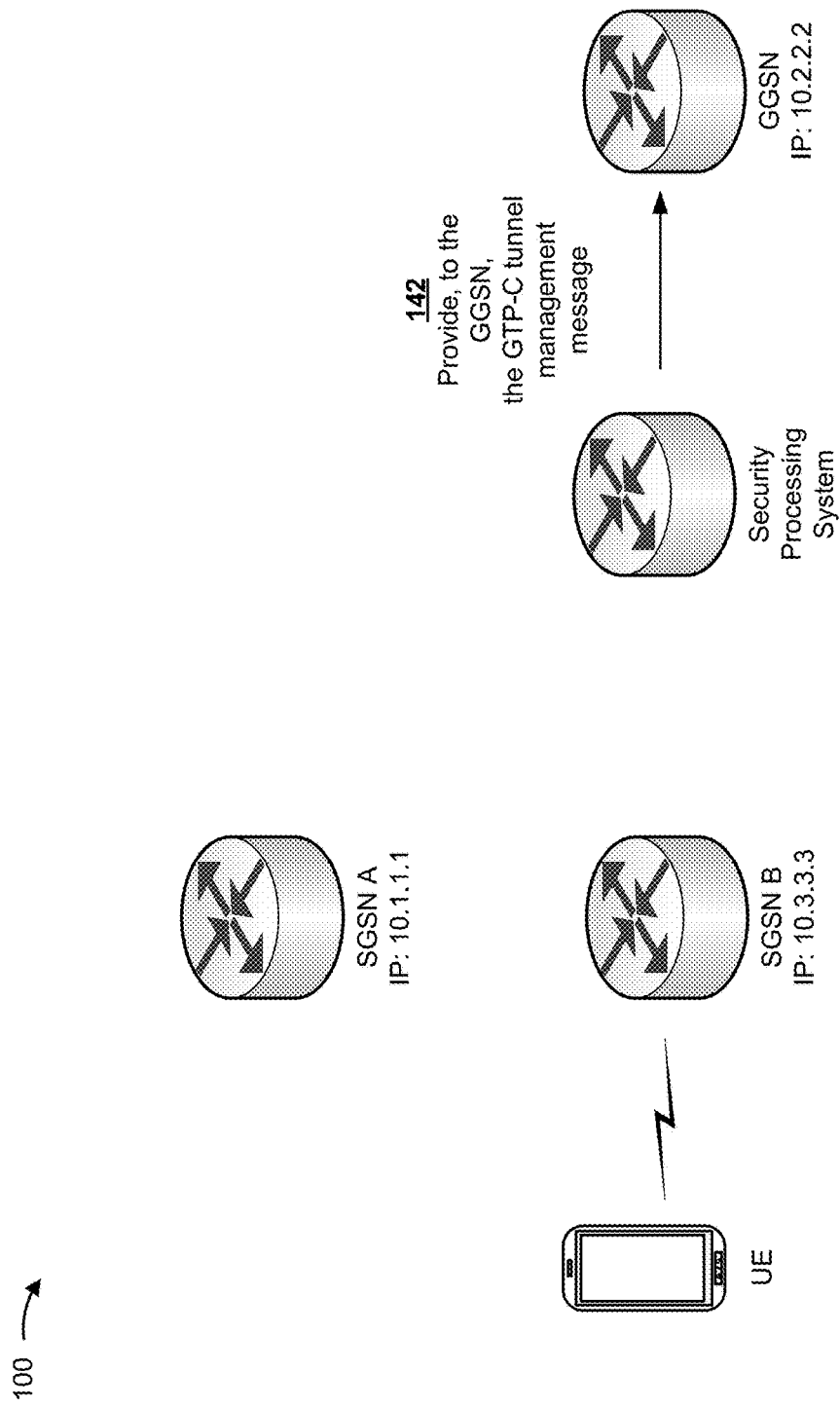

As shown in FIG. 1K, and by reference number 142, the security processing system may provide, to the GGSN, the GTP-C tunnel management message. In this way, the GGSN may receive the GTP-C tunnel management message, and update SGSN information associated with the GTP tunnel. Additionally, in this way, the GGSN may provide, to SGSN B, network traffic (e.g., received from external packet data networks and addressed to the UE) via the GTP tunnel.

In this way, implementations described herein enable a services processing device to determine that another services processing device is to process a flow between an SGSN and a GGSN, and provide, to the other services processing device, information that identifies that the other services processing device is to process the flow. In this way, implementations described herein reduce packet losses and/or other communication issues associated with a failed handover, thereby conserving processor and/or memory resources of UEs, network devices (e.g., SGSNs, GGSNs, SGWs, PGWs, MMEs, or the like), and/or conserving network resources.

As indicated above, FIGS. 1A-1K are provided merely as an example. Other examples are possible and may differ from what was described with regard to FIGS. 1A-1K.

Figure 2:
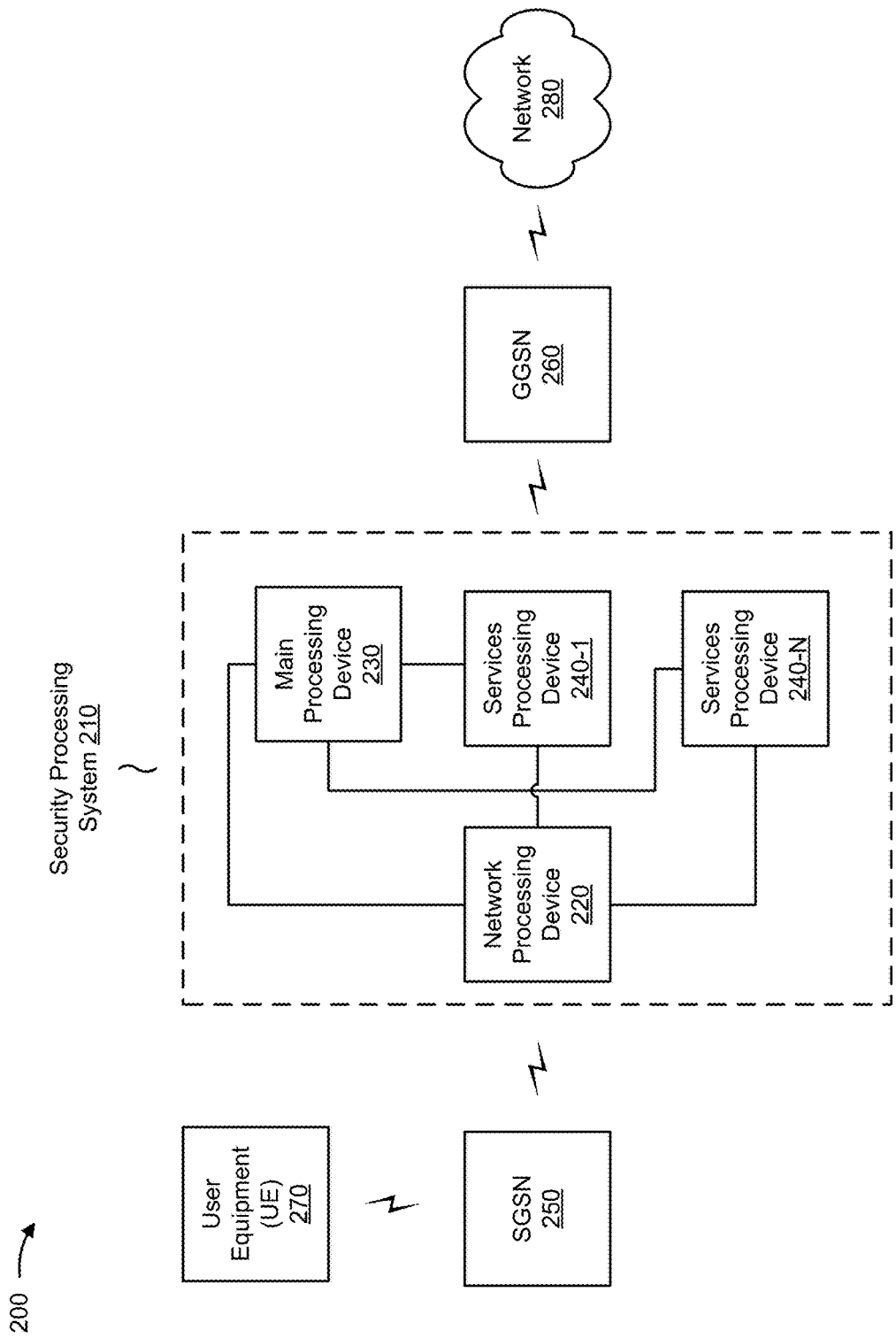
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a security processing system 210, which may include a network processing device 220, a main processing device 230, one or more services processing devices 240-1 through 240-N(N≥1) (hereinafter referred to collectively as "services processing devices 240," and individually as "services processing device 240"). Furthermore, environment 200 may include an SGSN 250, a GGSN 260, a UE 270, and a network 280. Devices of environment 200 may interconnect via wired connections, wireless connections, or a combination of wired and wireless connections.

As shown, security processing system 210 includes network processing device 220, main processing device 230, and multiple services processing devices 240. Security processing system 210 may process network traffic, for security purposes, for quality of service purposes, for analytics purposes, or the like. In some implementations, network processing device 220, main processing device 230, and services processing devices 240 may be located proximate to one another (e.g., on a same board, in a same chassis, in a same rack, in a same data center, or in a same geographic location). In some implementations, network processing device 220, main processing device 230, and/or one or more services processing devices 240 may be located remote from one another (e.g., on different boards, in different chasses, in different racks, in different data centers, or in different geographic locations).

Network processing device 220 includes one or more devices or one or more components of a device capable of processing and transferring network traffic. For example, network processing device 220 may include a router, a switch, a gateway, a firewall, a hub, a bridge, a reverse proxy, a server (e.g., a proxy server, a server executing a virtual machine, etc.), a security device, an intrusion detection device, a load balancer, a line card (e.g., in a chassis-based system), a similar device, or a component of one of these devices. In some implementations, network processing device 220 may receive, from SGSN 250 or GGSN 260, tunneling protocol messages, and provide the tunneling protocol messages to main processing device 230 (e.g., if a tunneling protocol message is the first tunneling protocol message associated with a flow) or a particular services processing device 240 (e.g., if the tunneling protocol message is a subsequent tunneling protocol message associated with a flow).

Main processing device 230 includes one or more devices or one or more components of a device capable of processing and/or transferring network traffic. For example, main processing device 230 may include a router, a switch, a gateway, a firewall, a hub, a bridge, a reverse proxy, a server (e.g., a proxy server, a server executing a virtual machine, etc.), a security device, an intrusion detection device, a load balancer, a similar device, or a component of one of these devices. In some implementations, main processing device 230 may process tunneling protocol messages associated with a flow, and provide an instruction to a particular services processing device 240 to store an entry associated with the flow (e.g., to perform express processing).

Services processing device 240 includes one or more devices or one or more components of a device capable of processing and transferring network traffic. For example, services processing device 240 may include a router, a switch, a gateway, a firewall, a hub, a bridge, a reverse proxy, a server (e.g., a proxy server, a server executing a virtual machine, etc.), a security device, an intrusion detection device, a load balancer, a line card (e.g., in a chassis-based system), a similar device, or a component of one of these devices. In some implementations, services processing device 240 may process tunneling protocol messages associated with a flow.

SGSN 250 includes one or more devices capable of routing network traffic. For example, SGSN 250 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGSN 250 may aggregate traffic received from one or more base stations (e.g., eNBs) associated with the LTE network, and may send the aggregated traffic to network 280 (e.g., via GGSN 260) and/or other network devices associated with an Evolved Packet Core (EPC) and/or an Internet Protocol Multimedia Subsystem (IMS) core associated with the LTE network. In some implementations, SGSN 250 may include a serving gateway (SGW), and/or a mobility management entity (MME) device.

GGSN 260 includes one or more devices capable of providing connectivity for UE 270 to external packet data networks (e.g., other than an EPC network or LTE network). For example, GGSN 260 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, GGSN 260 may aggregate network traffic received from one or more SGSNs 250, and may send the aggregated network traffic to network 280. In some implementations, GGSN 260 may include a PGW.

UE 270 includes one or more devices capable of connecting to a network via a base station. For example, UE 270 may include a communication device, such as a mobile phone (e.g., a smart phone, a radiotelephone, etc.), a tablet computer, a wearable communication device (e.g., a smart wristwatch, a pair of smart eyeglasses, etc.), or a similar type of device.

Network 280 includes one or more wired and/or wireless networks. For example, network 280 may include a cellular network (e.g., a 5G network, an LTE network, a code division multiple access (CDMA) network, a third generation (3G) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
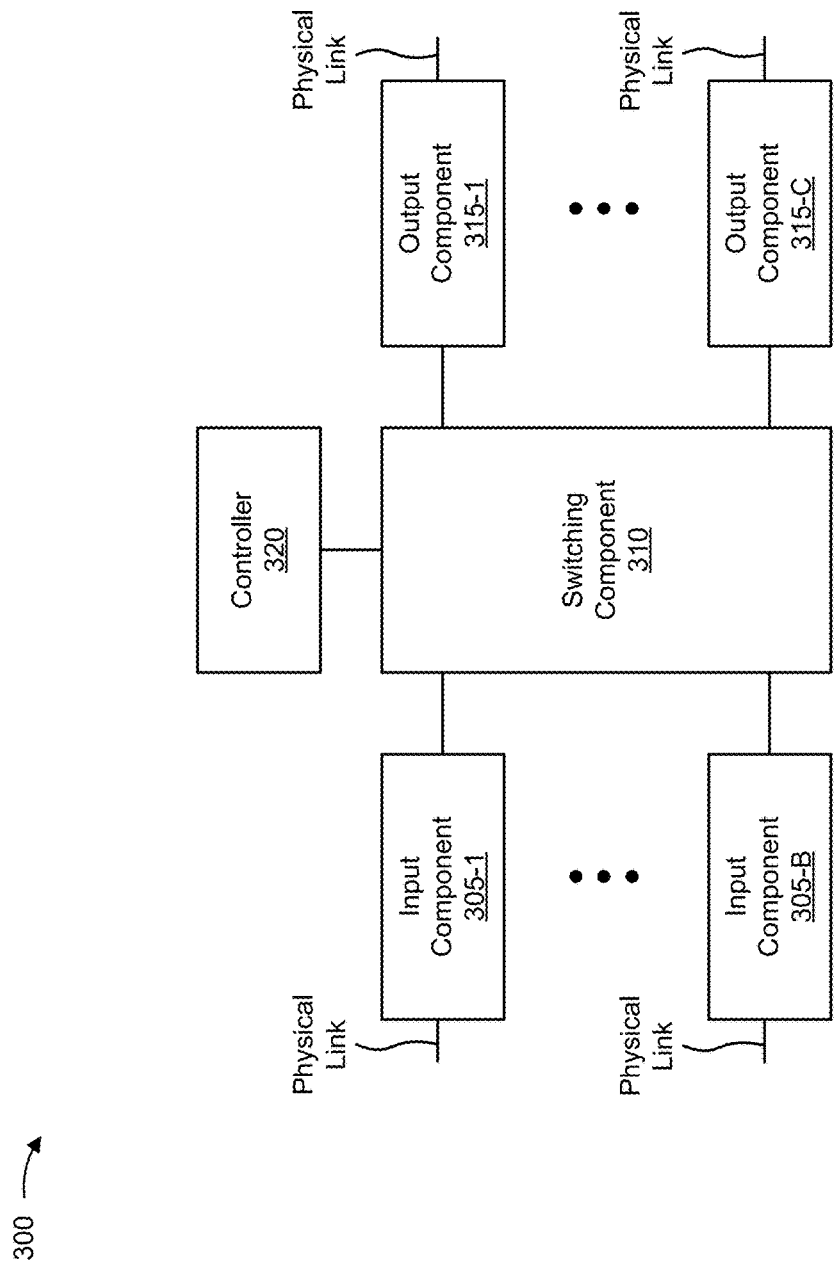
FIG. 3 is a diagram of example components of one or more devices of FIG. 2.

FIG. 3 is a diagram of example components of a device 300. Device 300 may correspond to security processing system 210, network processing device 220, main processing device 230, services processing device 240, SGSN 250, GGSN 260, and/or UE 270. In some implementations, security processing system 210, network processing device 220, main processing device 230, services processing device 240, SGSN 250, GGSN 260, and/or UE 270 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor that takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing flow processing migration. In some implementations, one or more process blocks of FIG. 4 may be performed by security processing system 210. In some implementations, one or more process blocks of FIG. 4 may be performed by another device or a group of devices separate from or including security processing system 210, such as SGSN 250, GGSN 260, and or UE 270.

As shown in FIG. 4, process 400 may include receiving, from a first network device, a tunneling protocol message associated with a second network device (block 410). For example, services processing device 240-1 (i.e., a first services processing device) may receive, from SGSN 250 (i.e., a first network device), a GTP-C message associated with GGSN 260 (i.e., a second network device). Alternatively, services processing device 240-1 (i.e., the first services processing device) may receive, from GGSN 260, a GTP-C message associated with GGSN 260. In some implementations, the tunneling protocol message may request GGSN 260 to establish a GTP tunnel with SGSN 250. In this case, the tunneling protocol message may be a unidirectional message.

In some implementations, the tunneling protocol message may be associated with a tunnel to be established between SGSN 250 (i.e., the first network device) and GGSN 260 (i.e., the second network device). For example, the tunnel may permit UE 270 to receive network traffic associated with a packet network.

In some implementations, services processing device 240-1 may receive a GTP-C ECHO message (i.e., a bidirectional message), and store an entry, in a table of services processing device 240-1, for a flow between SGSN 250 and GGSN 260 based on the GTP-C ECHO message. Additionally, or alternatively, services processing device 240-1 may provide, to network processing device 220, an instruction that causes network processing device 220 to forward subsequent tunneling protocol messages to services processing device 240-1. Additionally, services processing device 240-1 may receive the tunneling protocol message based on providing the instruction.

Additional details regarding receiving, from a first network device, a tunneling protocol message associated with a second network device are described above in connection with FIGS. 1A-1K.

As further shown in FIG. 4, process 400 may include determining a device identifier of the second network device based on the tunneling protocol message (block 420), and determining that a second services processing device is to process a flow associated with the first network device and the second network device based on the device identifier of the second network device (block 430). For example, services processing device 240-1 may determine a device identifier of GGSN 260 based on the GTP-C message, and determine that services processing device 240-2 (i.e., the second services processing device) is to process a flow associated with SGSN 250 and GGSN 260.

In some implementations, services processing device 240-1 may identify a type of the tunneling protocol message, and determine the device identifier of GGSN 260 based on the type of the tunneling protocol message. For example, a type may refer to a particular GTP-C message (e.g., create session request, create bearer request, create PDP context request, modify bearer request, forward relocation request, forward relocation response, or the like), a unidirectional message, a bidirectional message, or the like. Based on identifying the type of the tunneling protocol message, services processing device 240-1 may determine an appropriate location, within the tunneling protocol message, where the device identifier of GGSN 260 is stored.

Additionally, or alternatively, services processing device 240-1 may identify a direction of the tunneling protocol message, and determine the device identifier of GGSN 260 based on the direction. For example, a direction may identify that the tunneling protocol message is provided from SGSN 250 to GGSN 260, or vice versa. Based on identifying the direction of the tunneling protocol message, services processing device 240-1 may determine an appropriate location, within the tunneling protocol message, where the device identifier of GGSN 260 is stored.

In some implementations, services processing device 240-1 may store information that maps the device identifier of GGSN 260 to services processing device 240-2, and determine that services processing device 240-2 is to process the flow based on the information.

In some implementations, services processing device 240-1 may have been previously identified to process the flow associated with SGSN 250 and GGSN 260.

Additional details regarding determining a device identifier of the second network device based on the tunneling protocol message, and determining that a second services processing device is to process a flow associated with the first network device and the second network device based on the device identifier of the second network device are described above in connection with FIGS. 1A-1K.

As further shown in FIG. 4, process 400 may include providing information that identifies that the second services processing device is to process the flow to permit the second services processing device to process the flow (block 440). For example, services processing device 240-1 may provide information that identifies that services processing device 240-2 is to process the flow. In some implementations, services processing device 240-1 may provide, to services processing device 240-2, the GTP-C message including information that identifies that services processing device 240-2 is to process the flow. Additionally, or alternatively, services processing device 240-2 may provide, to main processing device 230 and/or network processing device 220, information that identifies that services processing device 240-2 is processing the flow. Additionally, or alternatively, main processing device 230 and/or network processing device 220 may store information that identifies that services processing device 240-2 is processing the flow.

In some implementations, services processing device 240-1 may provide, to main processing device 230, the GTP-C message including information that identifies that services processing device 240-2 is to process the flow. For example, services processing device 240-1 may adjust the GTP-C message to include information that identifies that services processing device 240-2 is to process the flow (e.g., set one or more bit values, or the like). Additionally, or alternatively, main processing device 230 may receive the GTP-C message including the information, and provide, to services processing device 240-2, the GTP-C message including the information. Additionally, or alternatively, services processing device 240-2 may store an entry for the flow (e.g., to perform express processing, as described elsewhere herein).

In some implementations, services processing device 240-1 may cause an entry, stored in a table of services processing device 240-1, to expire based on providing the information that identifies that services processing device 240-2 is to process the flow. For example, services processing device 240-1 may remove the entry for the flow, may cause the entry to expire based on a time frame (e.g., set a timeout value such as two seconds, four seconds, thirty seconds, etc.), may cause the entry to be updated, or the like.

Additional details regarding providing information that identifies that the second services processing device is to process the flow to permit the second services processing device to process the flow to permit the second services processing device to process the flow are described above in connection with FIGS. 1A-1K.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a main processing device to select a services processing device to process a flow, associated with an SGSN and a GGSN, without having properly identified a device identifier of a GGSN (e.g., based on bidirectional messages between the SGSN and the GGSN). Additionally, implementations described herein enable the selected services processing device to subsequently and properly determine a device identifier of the GGSN (e.g., based on a unidirectional message from the SGSN to the GGSN or from the GGSN to the SGSN), and determine that another services processing device is to process the flow (e.g., determine that the main processing device inaccurately selected the selected services processing device). Additionally, implementations described herein enable the selected services processing device to provide information that identifies that the other services processing device is to process the flow to permit the other services processing device to process the flow (e.g., migrate flow processing to another services processing device). In this way, the other services processing device may store information associated with a GTP tunnel between the SGSN and the GGSN. Additionally, in this way, the other services processing device may subsequently and properly receive, from another SGSN, a GTP-C tunnel management message (e.g., associated with a UE handover), and provide the GTP-C tunnel management message to the GGSN. In this way, implementations described herein enable the UE handover to be successful, thereby reducing communication issues, conserving processor and/or memory resources of UEs, SGSNs, GGSNs, and/or security processing systems, and/or conserving network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first processing device, comprising:
one or more memories; and
one or more processors, communicatively coupled to the one or more memories, to:
receive, from a first network device, a tunneling protocol message associated with a tunnel to be established between the first network device and a second network device,
the tunnel to permit a user equipment to receive network traffic associated with a packet network;
determine, based on the tunneling protocol message, a device identifier of the second network device;
determine that a second processing device is to process a flow associated with the first network device and the second network device based on the device identifier of the second network device,
the first processing device having been previously identified to process the flow;
provide information that identifies that the second processing device is to process the flow to permit the second processing device to process the flow; and
provide, to a third processing device, an instruction that causes the third processing device to forward, to the first processing device, subsequent tunneling protocol messages associated with the flow,
wherein the one or more processors, when receiving, from the first network device, the tunneling protocol message, are to:
receive the tunneling protocol message based on the instruction.

2. The first processing device of claim 1, where the one or more processors are further to:
adjust the tunneling protocol message to include information that identifies that the second processing device is to process the flow;
provide, to a fourth processing device, the tunneling protocol message after adjusting the tunneling protocol message; and
where the one or more processors, when providing the information that identifies that the second processing device is to process the flow, are to:
provide the information that identifies that the second processing device is to process the flow based on providing the tunneling protocol message.

3. The first processing device of claim 1, where the one or more processors are further to:
adjust the tunneling protocol message to include information that identifies that the second processing device is to process the flow;
provide, to the second processing device, the tunneling protocol message after adjusting the tunneling protocol message; and
where the one or more processors, when providing the information that identifies that the second processing device is to process the flow, are to:
provide the information that identifies that the second processing device is to process the flow based on providing the tunneling protocol message.

4. The first processing device of claim 1, where the one or more processors are further to:
remove, from a table of the first processing device, an entry for the flow based on providing the information that identifies that the second processing device is to process the flow.

5. The first processing device of claim 1, where the one or more processors are further to:
receive, from a fourth processing device, a general packet radio service tunneling protocol (GTP)-C ECHO message.

6. The first processing device of claim 1, where the one or more processors are further to:
identify a type of the tunneling protocol message; and
where the one or more processors, when determining, based on the tunneling protocol message, the device identifier of the second network device, are to:
determine the device identifier based on the type of the tunneling protocol message.

7. The first processing device of claim 1, where the first network device is a serving general packet radio service (GPRS) support node and where the second network device is a gateway GPRS support node.

8. A non-transitory computer-readable medium storing instructions, the instructions comprising:
one or more instructions that, when executed by one or more processors of a first device, cause the one or more processors to:
receive, from a first network device, a tunneling protocol message associated with a tunnel to be established between the first network device and a second network device,
the tunnel to permit a user equipment to access a packet network;
determine, based on the tunneling protocol message, a device identifier of the second network device;
determine that a second device is to process a flow associated with the first network device and the second network device based on the device identifier of the second network device,
the first device having been previously identified to process the flow; and
provide information that identifies that the second device is to process subsequent tunneling protocol messages associated with the flow,
where providing the information that identifies that the second device is to process the subsequent tunneling protocol messages comprises:
providing the information that identifies that the second device is to process the subsequent tunneling protocol messages based on providing the tunneling protocol message.

9. The non-transitory computer-readable medium of claim 8, where the one or more instructions, when executed by the one or more processors, further cause the one or more processors to:

adjust the tunneling protocol message to include the information that identifies that the second device is to process the flow; and provide, to a third device, the tunneling protocol message based on adjusting the tunneling protocol message.

10. The non-transitory computer-readable medium of claim 8, where the one or more instructions, when executed by the one or more processors, further cause the one or more processors to:

provide, to the second device, the tunneling protocol message.

11. The non-transitory computer-readable medium of claim 8, where the one or more instructions, when executed by the one or more processors, further cause the one or more processors to:

cause an entry, stored by the first device, to be updated to identify the second device rather than the first device after determining that the second device is to process the flow.

12. The non-transitory computer-readable medium of claim 8, where the one or more instructions, when executed by the one or more processors, further cause the one or more processors to:

identify a direction of the tunneling protocol message; and where the one or more instructions, that cause the one or more processors to determine the device identifier of the second network device, cause the one or more processors to:

determine the device identifier of the second device based on the direction of the tunneling protocol message.

13. The non-transitory computer-readable medium of claim 8, where the tunneling protocol message requests the second network device to establish the tunnel with the first network device.

14. The non-transitory computer-readable medium of claim 8, where the one or more instructions, when executed by the one or more processors, further cause the one or more processors to:

store information that maps the device identifier of the second network device to the second device; and where the one or more instructions, that cause the one or more processors to determine that the second device is to process the flow, cause the one or more processors to:

determine that the second device is to process the flow based on the information that maps the device identifier of the second network device to the second device.

15. A method, comprising:

receiving, by a first device, a tunneling protocol message associated with a tunnel associated with a first network device and a second network device, the tunnel to permit a user equipment to access a network;

determining, by the first device, a direction or a type of the tunneling protocol message;

determining, by the first device, a device identifier of the second network device based on the direction or the type of the tunneling protocol message;

determining, by the first device and based on the device identifier of the second network device, that a second device is to process a flow between the first network device and the second network device, the first device having been previously identified to process the flow; and providing, by the first device, information that identifies that the second device is to process subsequent tunneling protocol messages associated with the flow, where providing the information that identifies that the second device is to process the subsequent tunneling protocol messages comprises:

providing the information that identifies that the second device is to process the subsequent tunneling protocol messages based on providing the tunneling protocol message.

16. The method of claim 15, further comprising:

receiving, from a third device, a general packet radio service tunneling protocol (GTP)-C ECHO message;

storing, in a table of the first device, an entry for the flow based on the GTP-C ECHO message; and where receiving the tunneling protocol message comprises:

receiving the tunneling protocol message based on the entry for the flow.

17. The method of claim 15, further comprising:

providing, to a third device, the tunneling protocol message including information that identifies that the second device is to process the flow.

18. The method of claim 15, further comprising:

providing, to the second device, the tunneling protocol message including the information that identifies that the second device is to process the flow.

19. The method of claim 15, further comprising:

identifying the type of the tunneling protocol message; and where determining the device identifier of the second device comprises:

determining the device identifier of the second device based on the type.

20. The method of claim 15, further comprising:

identifying the direction of the tunneling protocol message; and where determining the device identifier of the second device comprises:

determining the device identifier of the second device based on the direction.

* * * * *